United States Patent [19]  [11]  4,126,251
Subwick  [45]  Nov. 21, 1978

[54] CALKING GUN PRESSURE RELEASE MECHANISM

[75] Inventor: Norbert A. Subwick, Richmond Heights, Ohio

[73] Assignee: Chester E. Borys, Orland Park, Ill.

[21] Appl. No.: 759,501

[22] Filed: Jan. 14, 1977

[51] Int. Cl.² .............................................. B67D 5/42
[52] U.S. Cl. .................................... 222/326; 222/391; 74/155
[58] Field of Search .................. 222/391, 326; 74/155, 74/169

[56] References Cited

U.S. PATENT DOCUMENTS

| 1,672,421 | 6/1928 | Negley | 222/391 |
| 2,102,939 | 12/1937 | Bishop | 222/326 |
| 2,180,978 | 11/1939 | Crewe | 74/169 |
| 2,367,347 | 1/1945 | Good | 222/391 X |
| 2,732,102 | 1/1956 | Ekins | 222/391 X |

FOREIGN PATENT DOCUMENTS 729,564  5/1955  United Kingdom ..................... 222/391

Primary Examiner—Robert B. Reeves
Assistant Examiner—Charles A. Marmor
Attorney, Agent, or Firm—Bernard L. Kleinke

[57] ABSTRACT

A pressure release mechanism for a calking gun adapted to receive a calking material containing cartridge tube and having a piston device for applying pressure to the tube for dispensing calking material therefrom enables the pressure to be released by the user to stop the calking material from flowing from the tube. The cartridge gun includes a ratchet device for advancing selectively and releasably the piston device, and the piston device includes a piston rod having ratchet teeth therein. The ratchet device includes a pawl and a latching dog for engaging the ratchet teeth. The pressure release mechanism includes a lever pivotally mounted near the latching dog for contacting it and moving it out of engagement with the teeth to free the piston rod. A manually operable device is connected to the lever and is adapted to be grasped by the user in a convenient manner for moving pivotally the lever to cause it to move the latching dog and thus to free the rod.

8 Claims, 4 Drawing Figures

U.S. Patent  Nov. 21, 1978  4,126,251
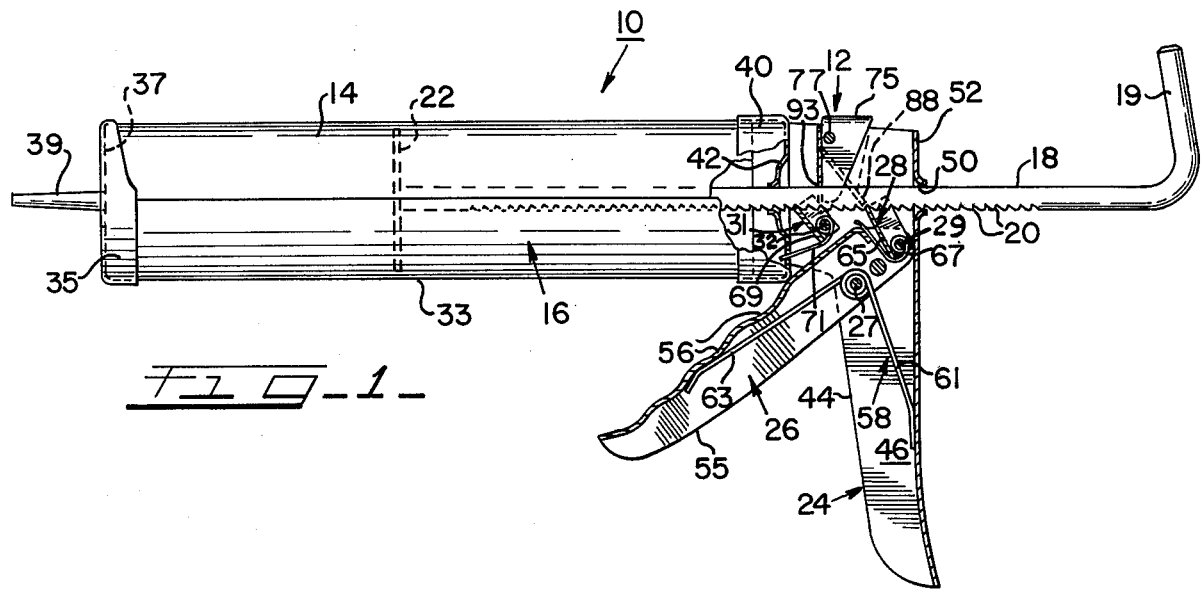
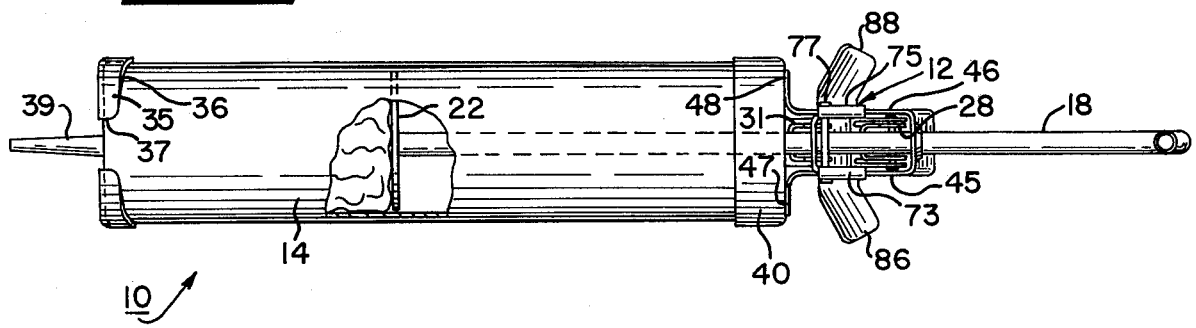
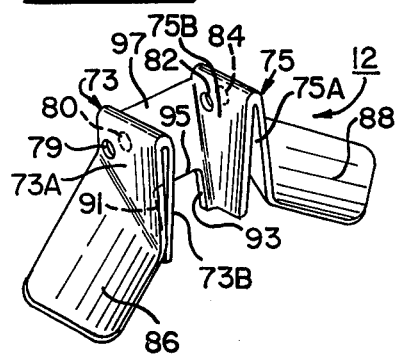
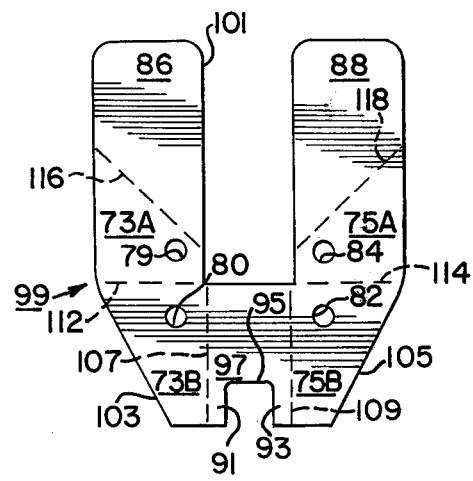

CALKING GUN PRESSURE RELEASE MECHANISM

The present invention relates to a calking gun pressure release mechanism, and more particularly relates to a pressure release mechanisum for a calking gun having a ratchet mechanism and a piston device for applying pressure to a calking material containing cartridge tube.

Calking guns having ratchet mechanisms and piston devices have been employed to apply pressure to calking material containing tubes for dispensing calking material therefrom. Such calking guns have been widely used, since they are highly efficient in operation and are relatively inexpensive to manufacture. As a result, such calking guns have been widely accepted by the general public and are currently in wide-scale use. In order to release the pressure on the cartridge tube, the piston device includes a rod having ratchet teeth on only one side thereof so that the rod may be grasped by the hand of the user and rotated about its axis through 180 degrees to free the rod from the ratchet mechanism which includes a pawl and a latching dog. While such a calking gun is acceptable for some applications, it would be highly desirable to have a pressure release mechanism for such a calking gun which would relieve the pressure exerted on the calking material containing cartridge tube in a quick and easy manner so that the flow of calking material from the calking cartridge tube can be interrupted during use or after the calking operation has been completed. In this regard, such a pressure release mechanism should be adapted to be actuated by one hand in a quick and easy manner without having to rotate the piston rod. Also, such a pressure release mechanism should be relatively inexpensive to manufacture, and it should be convenient to actuate by either hand of the user since a calking gun can be held in either the right or left hand during use.

Therefore, the principal object of the present invention is to provide a new and improved calking gun pressure release mechanism which can quickly and easily release the pressure on a calking material containing cartridge tube without having to rotate the piston rod exerting the pressure applied by a ratchet mechanism.

Another object of the present invention is to provide such a new and improved calking gun pressure release mechanism, which is relatively inexpensive to manufacture and which can be quickly and easily activated while the calking gun is held in either the right or left hand of the user.

Briefly, the above and further objects of the present invention are realized by providing a lever pivotally mounted near the latching dog of the ratchet mechanism for the calking gun so that the lever contacts the latching dog and moves it out of engagement with the teeth to free the piston rod. A manually operable means in the form of a tab connected to the lever is adapted to be grasped by the user for moving pivotally the lever to cause it to move in turn the latching dog and thus to free the piston rod.

These and further objects of the present invention will be understood more fully and more completely from the following detailed description when considered with reference to the accompanying drawings, wherein:

FIG. 1 is a fragmentary cross-sectional side elevational view of a calking gun having a pressure release mechanism which is constructed in accordance with the present invention;

FIG. 2 is a plan view of the calking gun of FIG. 1 with a portion thereof broken away for illustration purposes;

FIG. 3 is a greatly enlarged pictorial view of the pressure release mechanism of the calking gun of FIG. 1; and FIG. 4 is a plan view of a blank for use in making the pressure release mechanism of FIG. 3.

Referring now to the drawings, and more particularly to FIGS. 1 and 2 thereof, there is shown a calking gun 10 having a pressure release mechanism 12 mounted thereon to control the flow of calking material from a conventional calking cartridge tube 14, the pressure release mechanism 12 being constructed in accordance with the present invention. The calking gun 10 generally comprises an open tubular barrel 16 for receiving the conventional calking cartridge tube 14, and a ratchet rod 18 extending into the barrel 16 and being axially aligned therewith, the ratchet rod 18 extending rearwardly out of the barrel 16 and terminating in a rear bent-up handle 19, the underside of the ratchet rod 18 having ratchet teeth 20 disposed therein. A piston head plate 22 is mounted on the front end of the ratchet rod 18 for applying pressure to the conventional cartridge tube 14 in an axial direction to dispense the calking material therefrom.

The calking gun 10 further includes a channel-shaped handle 24 extending at right angles to the barrel 16 to be grasped by the hand of the user, and a trigger 26 is pivotally attached at 27 to the handle 26 and extending angularly in a spaced-apart manner relative thereto so that the user can grasp the trigger 26 with the fingers of the hand to squeeze the trigger and cause it to pivot in a counter-clockwise direction as viewed in FIG. 1 of the drawings until the trigger 26 is disposed within the open channel-shaped handle 24. A channel-shaped ratchet pawl 28 is pivotally attached at 29 to the handle 24 for engaging the teeth 20 of the rod 18 for advancing the rod 18 axially to apply the axially directed pressure on the tube 14. A channel-shaped latching dog 31 is pivotally connected at 32 to the handle 24 for engaging the teeth 20 to retain the rod 18 in position after being advanced by the pawl 28, thereby maintaining the pressure on the tube 14.

In use, the tube 14 is positioned within the barrel 16 of the calking gun 10, and thereafter, the handle 19 of the rod 18 is grasped by the hand of the user and the rod 18 is then pushed axially toward the rear end of the tube 14. The rod 18 is then positioned with the teeth 20 disposed downwardly as shown in the drawings. The user then grasps the handle 24 and, with the fingers of the same hand, grasps and encircles the trigger 26 to squeeze it towards the handle 24. As a result, the pawl 28 advances the rod 18 forwardly to apply pressure to the tube 14 for dispensing calking material therefrom. The latching dog 31 engages the teeth 20 of the rod 18 for maintaining the rod 18 in the advanced position against the pressure applied to the plate 22 by the tube 14.

In order to release the pressure on the tube 14 to terminate the flow of calking material therefrom, the pressure release mechanism 12 may be actuated by the thumb of the hand holding the gun 10 to pivot it in a clockwise direction as viewed in FIG. 1 of the drawings, as hereinafter described in greater detail, to push the latching dog 31 out of engagement with the teeth 20.

As a result, the pressure exerted on the plate 22 by the squeezed tube 14 causes the rod 18 to move backwardly by a slight amount. Thereafter, the mechanism 12 is released, and the latching dog 31 returns to its initial position in engagement with the teeth 20, as hereinafter described in greater detail. When it is desired to dispense an additional amount of calking material from the tube 14, the operation can then be repeated. It should be understood at this point that the calking gun 10 and the mechanism 12 may be operated in two different modes of operation. In the first mode of operation, during a calking operation where calking material is being dispensed from the tube 14 by the pressure applied by the piston head plate 22 acting on the tube 14, the flow can be terminated in the manner as previously described by a single movement of the thumb of the user against the mechanism 12 and then quickly releasing the pressure of the thumb against the release mechanism 12. Such action then accomplishes the termination of the pressure acting on the tube 14. In the second mode of operation, the pressure applied to the tube 14 can be adjusted at the time of actuating the trigger 26. In this regard, the trigger can be squeezed into a position close to the handle 24, and before the trigger 26 is released, the mechanism 12 can be actuated by the thumb of the user and held in position until the trigger 26 is released. In this mode of operation, the latching dog 31 is released and held in its disengaged position relative to the teeth 20 during the length of time that the trigger 26 is released. In so doing, the plate 22 advances and applies a pressure to the tube 14 for commencing a flow of calking material from the tube 14, and then the plate 22 immediately thereafter retracts from the tube 14, since the latching dog 31 is inhibited from performing its function. The overall result is that a predetermined quantity of calking material is dispensed from the tube 14, and then the flow terminates.

Considering now the construction of the barrel 16 with reference to FIGS. 1 and 2 of the drawings, the barrel 16 includes a semi-circular C-shaped tube holder 33. The semi-circular opened top C-shaped tube holder 33 includes a front end open cap 35 having a cut-away opening 36 terminating in an opening 37 to receive a nozzle 39 of the tube 14. A similar rear-end open cap 40 faces the front end cap to retain the tube 14 between the two caps. In this regard, in order to load the tube 14 into the barrel 16, the rear end of the tube 14 is first inserted into the rear cap 40, and then the tube 14 is dropped into the tube holder 33 with the nozzle 39 of the tube 14 slipping into the opening of 37.

A centrally aperatured rear wall 42 of the rear end cap 40 permits the rod 18 to extend there through so that the plate 22 fixed to the front end of rod 18 can be retracted into the open rear end cap 40 during the loading of the tube 14. When the rod 18 is advanced to apply pressure to the rear end portion of the tube 14, the front end cap 35 retains the tube 14, whereby the plate 22 enters the interior of the tube 14 in a conventional manner as shown in FIGS. 1 and 2 of the drawings for squeezing the calking material contained in the tube 14 to cause it to flow from the nozzle 39.

Considering now the handle 24 in greater detail with reference to FIGS. 1 and 2 of the drawings, the handle 24 includes a channel-shaped member of 44 which opens forwardly. As shown in FIG. 2 of the drawings, the member 44 includes a pair of side legs 45 and 46 which are connected to the barrel 16 by means of a pair of flanges 47 and 48 extending at right angles to the side legs 45 and 46, respectively, the flanges 47 and 48 be integrally connected to the respective side legs 45 and 46 and being fixed to the rear outer surface of the rear wall 42 of the end cap 40. A hole 50 in a rear wall 52 of the handle 24 permits the rod 16 to extend outwardly from the handle 24 in the position as shown in FIGS. 1 and 2 of the drawings.

Considering now the trigger 26 in greater detail with reference to FIGS. 1 and 2 of the drawings, the trigger 26 includes a channel-shaped member 55 having an outer finger grip serrations or configurations 56. A spring 58 surrounding the pivot point 27 and having end portions where legs 61 and 63 resiliently urge or bias the trigger 26 into a spaced-apart relationship relative to the handle 26 so that the trigger 26 extends at approximately a 45° angle forwardly away from the handle 24, which extends approximately a right angle relative to the barrel 16. Therefore, when the user squeezes the trigger 26 by pulling it with the fingers of the user toward the handle 26, the trigger 26 may be released and it will snap back to the position as shown in FIG. 1 of the drawings by means of the spring 58.

Considering now the ratchet pawl 28 in greater detail, the pawl 28 includes a channel-shaped member 65 which is open rearwardly to engage the teeth 20 of the rod 18. A spring 67 resiliently urges the member 65 into engagement with the teeth 20 so that, when the trigger 26 is squeezed, the pawl 28 is carried by the upper end portion of the trigger 26 to drive the rod 18 forwardly. In so doing, the pawl 28 pivots about its pivot point 29. At the completion of the stroke of the rod 18, the trigger 26 is released and it pivots in a counter-clockwise direction about the pivot point 27 as viewed in FIG. 1 of the drawings, whereby the pawl 28 is carried rearwardly and the channel-shaped member 65 rides along the teeth or notches 20. When the trigger 26 comes to rest, the spring 67 again urges the channel-shaped member 65 into engagement with the teeth 20 so that a subsequent cycle of operation may be repeated.

Considering now the latching dog 31 in greater detail with reference to the drawings, the latching dog 31 includes a channel-shaped member 69 which opens rearwardly to receive the rod 18 and engage the teeth 20 in a manner similar to the pawl 28. A spring 71 resiliently urges the channel-shaped member 69 into engagement with the teeth 20. In their normal position as shown in FIG. 1 of the drawings, the ratchet pawl and the latching dog are inclined forwardly about a 45° angle from the pivot points so that their upper end portions engage the teeth 20.

Considering now the pressure release mechanism 12 in greater detail with reference to FIGS. 3 and 4 of the drawings, the mechanism 12 includes a pair of reversely-bent channel-shaped portions 73 and 75 which fit over and receive the respective upper edges of the side legs 45 and 46 of the handle 24, the side legs 45 and 46 being integrally connected to and forming extensions of the channel-shaped member 44. The channel-shaped portions 73 and 75 are generally U-shaped and include the portions 73A and 73B and the portions 75A and 75B, respectively. A pivot pin 77 extends through a series of aligned holes 79 and 80 in the respective portions 73A and 73B and the holes 82 and 84 and the respective portions 75A and 75B, as well as aligned holes (not shown) in the side legs 45 and 46, whereby the pivot pin 77 extends across the side legs 45 and 46 as shown in FIG. 2 of the drawings.

A pair of tabs 86 and 88 extend outwardly from opposite sides of the mechanism 12 so that either one of the tabs 86 and 88 may be grasped by the thumb of the user while holding the gun 10 and pivoted in a clockwise direction as viewed in FIG. 1 of the drawings about the pivot pin 77. In this regard, the gun 10 may be held in either the right or the left hand of the user, and, when held in the right hand, the thumb can readily engage the upper surface of the tab 86, the upper surface of the tab 88 being engaged by the left thumb when the gun 10 is held in the left hand. A lever in the form of a pair of downwardly depending parallel-spaced legs 91 and 93 defining the side edges of a cut-out 95 and a front wall 97 of the mechanism 10 engaged with their lower edge portions the two side flanges of the channel-shaped member 69 of the latching dog 31. In this regard, the front wall 97 extends across and integrally connects the two channel shaped portions 73 and 75, and, when the mechanism 12 is mounted on the handle 24, as shown in FIGS. 1 and 2 of the drawings, the front wall 97 extends downwardly between the pair of side legs 45 and 46 of the handle 24 to engage the pair of side flanges of the channel-shaped member 69, as shown in FIGS. 1 and 2 of the drawings. The cut-out opening 95 receives the rod 18 which extends there through so that the front wall 97 straddles the rod 18.

Referring now to FIG. 4 of the drawings, the manner in which the mechanism 12 is constructed will now be described. The mechanism 12 is preferably composed of a single member which is made by cutting out a blank 99 and then bending it into the desired shape as shown in FIG. 3 of the drawings. The blank 99 is generally H-shaped and is preferably composed of metal material which can be bent into the proper shape. The blank 99 is cut out into the shape as shown in FIG. 4 of the drawings and includes a rectangular cut-out opening 101 in the front wall 97 opposite the cut-out opening 91. The lower corners are cut away diagonally at 103 and 105 of the portions 73B and 75B respectively. The holes 79, 80, 82 and 84 are drilled through the blank as shown in the drawings.

In order to fold the blank 99 into the desired position, as shown in FIG. 3 of the drawings, the portions 73B and 75B are folded about the respective fold lines 107 and 109 upwardly out of the plane of the paper at right angles to the front wall 97. Thereafter, the portions 73A and 75A are folded reversely about the fold lines 112 and 114, respectively, to provide the reversely-bent channel-shaped portions 73 and 75. In so doing, the parafolds 79 and 80 and the parafolds 82 and 84 are moved opposite to one another, and both pairs are then disposed in alignment with one another as shown in FIG. 3 of the drawings. To complete the mechanism 12, the tabs 86 and 88 are bent outwardly at right angles to the portions 73A and 75A, respectively, about the diagonal fold lines 116 and 118.

Thereafter, the mechanism 12 can be slipped over the side legs 45 and 46, whereby the reversely bent channel-shaped 73 and 75 straddle the respective side legs 45 and 46 of the handle of 24. The pivot pin 77 is then slipped through the four aligned holes in the mechanism 12 and through a pair of the aligned holes (not shown) in the legs 45 and 46 to pivotally attach the mechanism 12 to the gun 10.

It should be noted that, with the tabs 86 and 88 extending outwardly on opposite sides of the gun 10, the tabs are disposed below the pivot pin 77 and they are inclined at approximately a 45° angle sloping rearwardly so that the thumb of the user can conveniently rest on the upper surface of the tabs when the gun 10 is held in the hand. Either one of the tabs can readily be pushed by the thumb of the user to activate the mechanism 12.

While the present invention has been described in connection with a particular embodiment thereof, it will be understood that many changes and modifications of this invention may be made by those skilled in the art without departing from the true spirit and scope thereof. Accordingly, the appended claims are intended to cover all such changes and modifications as fall within the true spirit and scope of the present invention.

What is claimed is:

1. In a calking gun having means mounted on frame means for receiving a calking material containing cartridge tube and having piston means movably mounted on said frame means for applying pressure to said tube for dispensing calking material therefrom and ratchet means for advancing selectively and releasably said piston means, said piston means including a piston rod having ratchet teeth therein, said ratchet means including a pawl and a latching dog for engaging said ratchet teeth, a pressure release mechanism, comprising:

lever means pivotally mounted near said latching dog for contacting it and moving it out of engagement with said teeth to free said piston rod;

a pair of portions of said frame means;

a pair of spaced-apart reversely-bent channel-shaped portions pivotally attaching and forming a part of said lever means to said pair of portions of said frame means; and manually operable means connected to said lever and adapted to be grasped by the user for moving pivotally said lever to cause it to move in turn said latching dog and thus to free said rod, said manually operable means including at least one outwardly extending tab connected to one of said channel-shaped portions and depending therefrom.

2. The combination according to claim 1, wherein said tab is integrally connected to one of said lever means at one side of said frame means of the calking gun and to its channel-shaped portion of said lever means.

3. The combination according to claim 2, wherein said manually operable means includes a second tab connected integrally to said lever means and to the other one of said channel-shaped portions opposite the first-mentioned tab on the opposite side of the frame means of the calking gun so that said release mechanism can be actuated from either side of the calking gun.

4. The combination according to claim 3, wherein said calking gun includes a channel-shaped handle connected to said means for receiving the cartridge tube, the ratchet teeth depending downwardly from the underside of the piston rod and the latching dog extending upwardly from beneath the teeth, said mechanism being pivotally attached to said handle above said latching dog and the piston rod, said lever means extending downwardly into engagement with said latching dog.

5. The combination according to claim 3, wherein said tabs are inclined rearwardly and slope backwardly and downwardly.

6. The combination according to claim 1, wherein said release mechanism includes a single blank bent into the desired shape.

7. The combination according to claim 6, wherein said blank is generally H-shaped.

8. In a calking gun having means mounted on frame means for receiving a calking material containing cartridge tube and having piston means movably mounted on said frame means for applying pressure to said tube for dispensing calking material therefrom and ratchet means for advancing selectively and releasably said piston means; said piston means including a piston rod having ratchet teeth therein, said ratchet means including a pawl and a latching dog for engaging said ratchet teeth, a pressure release mechanism, comprising:

lever means pivotally mounted near said latching dog for contacting it and moving it out of engagement with said teeth to free said piston rod;

a pair of portions of said frame means; and manually operable means connected to said lever and adapted to be grasped by the user for moving pivotally said lever to cause it to move in turn said latching dog and thus to free said rod, said lever means including a pair of legs for engaging said latching dog, said mechanism further including a pair of spaced-apart reversely-bent channel-shaped portions pivotally attached to the pair of portions of said frame means, a wall interconnecting said legs, said pair of spaced-apart reversely-bent channel-shaped portions forming a part of said lever means, said legs defining the opposite side edges of a cut-out opening receiving the rod.

* * * * *